(12) United States Patent
Gattringer

(10) Patent No.: US 12,055,247 B2
(45) Date of Patent: Aug. 6, 2024

(54) SEALING ARRANGEMENT, SEALING SLEEVE AND USE THEREOF

(71) Applicant: CARL FREUDENBERG KG, Weinheim (DE)

(72) Inventor: Rudolf Gattringer, Tragwein (AT)

(73) Assignee: CARL FREUDENBERG KG, Weinheim (DE)

( * ) Notice: Subject to any disclaimer, the term of this patent is extended or adjusted under 35 U.S.C. 154(b) by 111 days.

(21) Appl. No.: 17/312,014

(22) PCT Filed: Dec. 2, 2019

(86) PCT No.: PCT/EP2019/083234
§ 371 (c)(1),
(2) Date: Jun. 9, 2021

(87) PCT Pub. No.: WO2020/120184
PCT Pub. Date: Jun. 18, 2020

(65) Prior Publication Data
US 2022/0057031 A1 Feb. 24, 2022

(30) Foreign Application Priority Data
Dec. 11, 2018 (DE) ............... 10 2018 131 717.4

(51) Int. Cl.
*F16L 33/18* (2006.01)
*F16J 15/10* (2006.01)
(Continued)

(52) U.S. Cl.
CPC ............. *F16L 33/18* (2013.01); *F16J 15/102* (2013.01); *F16J 15/104* (2013.01); *F16L 21/03* (2013.01); *F16L 33/006* (2013.01); *F16L 33/28* (2013.01)

(58) Field of Classification Search
CPC ......... F16L 33/18; F16L 33/006; F16L 33/28; F16L 21/03; F16J 15/102; F16J 15/104
See application file for complete search history.

(56) References Cited

U.S. PATENT DOCUMENTS 2,924,472 A * 2/1960 Bush ............... F16L 17/025
29/451
2,935,349 A * 5/1960 Burch .............. F16L 17/025
285/295.2

(Continued)

FOREIGN PATENT DOCUMENTS

CN 110043666 A * 7/2019
DE 71417 A 11/1970
(Continued)

*Primary Examiner* — Gilbert Y Lee
(74) *Attorney, Agent, or Firm* — LEYDIG, VOIT & MAYER, LTD.

(57) ABSTRACT

A sealing arrangement includes: a first pipe and a second pipe, which are arranged substantially adjacent to each other in a flow direction and together form a line, the first pipe having a first end and the second pipe has a second end, the first end enclosing the second end at a radial spacing; and a sealing sleeve comprising a sealing material, the sealing sleeve being sealingly arranged under radial elastic preloading in a gap formed by the spacing and sealingly contacting an inner circumference of the first pipe and an outer circumference of the second pipe.

20 Claims, 1 Drawing Sheet

(51) Int. Cl.
*F16L 21/03* (2006.01)
*F16L 33/00* (2006.01)
*F16L 33/28* (2006.01)

(56) References Cited

U.S. PATENT DOCUMENTS

| | | | |
|---|---|---|---|
| 3,325,174 | A | 6/1967 | Weaver |
| 4,566,704 | A | 1/1986 | Van Dongeren |
| 4,622,703 | A * | 11/1986 | Cuschera ................. E03C 1/22 |
| | | | 277/606 |
| 5,137,308 | A * | 8/1992 | Engel ...................... F16L 21/03 |
| | | | 285/420 |
| 5,649,712 | A * | 7/1997 | Ekholm ................. F16L 21/02 |
| | | | 277/615 |
| 5,649,713 | A * | 7/1997 | Ledgerwood .......... F16J 15/025 |
| | | | 277/625 |
| 7,407,165 | B1 * | 8/2008 | Chisnell ................. F16L 21/02 |
| | | | 277/626 |
| 7,455,299 | B2 * | 11/2008 | Mori ................... F16L 55/1152 |
| | | | 277/609 |
| 7,802,798 | B2 * | 9/2010 | Beele ........................ F16L 5/14 |
| | | | 277/648 |
| 11,692,630 | B2 * | 7/2023 | Mancini ................. F16J 15/125 |
| | | | 277/628 |

FOREIGN PATENT DOCUMENTS

| | | |
|---|---|---|
| DE | 69104839 T2 | 3/1995 |
| GB | 2553789 A | 3/2018 |

\* cited by examiner

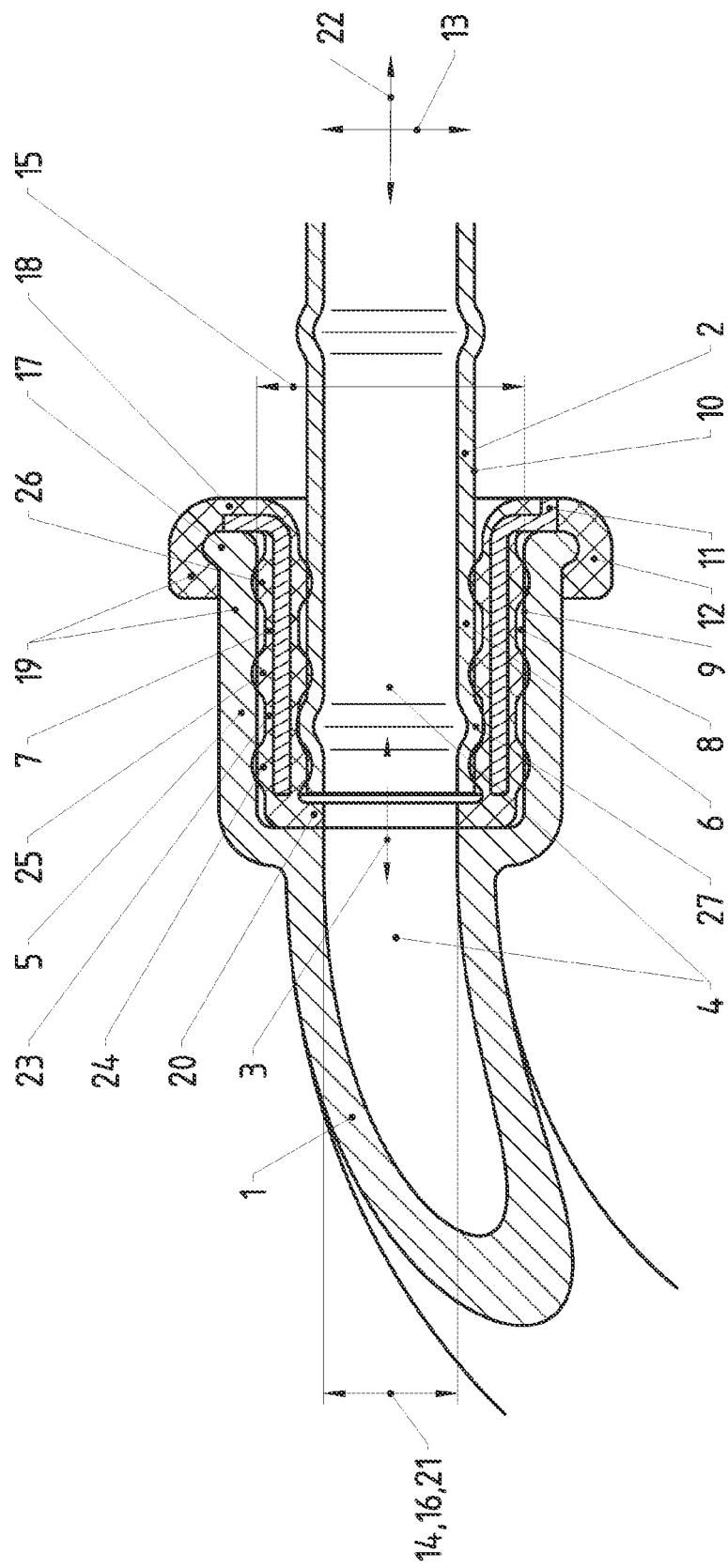

SEALING ARRANGEMENT, SEALING SLEEVE AND USE THEREOF

CROSS-REFERENCE TO PRIOR APPLICATIONS

This application is a U.S. National Phase application under 35 U.S.C. § 371 of International Application No. PCT/EP2019/083234, filed on Dec. 2, 2019, and claims benefit to German Patent Application No. DE 10 2018 131 717.4, filed on Dec. 11, 2018. The International Application was published in German on Jun. 18, 2020 as WO 2020/120184 under PCT Article 21(2).

FIELD

The invention relates to a sealing arrangement, a sealing sleeve and the use thereof.

BACKGROUND

The sealing arrangement comprises a first pipe and a second pipe, which are essentially arranged adjacent to each other in their flow direction and together form a line, wherein the pipes are sealingly connected to each other.

PRIOR ART

Such a sealing arrangement is generally known and is used, for example, in a coolant system of a motor vehicle. The sealing connection of the two pipes is achieved by means of complex hose connections, wherein the hose consists of a substantially rubber-elastic material and is fastened by clamp fasteners to the pipes that are arranged adjacent to each other. The hose connections and the clamp fasteners are in each case expensive to produce, and assembly is complex.

SUMMARY

In an embodiment, the present invention provides a sealing arrangement, comprising: a first pipe and a second pipe, which are arranged substantially adjacent to each other in a flow direction and together form a line, the first pipe having a first end and the second pipe has a second end, the first end enclosing the second end at a radial spacing; and a sealing sleeve comprising a sealing material, the sealing sleeve being sealingly arranged under radial elastic preloading in a gap formed by the spacing and sealingly contacting an inner circumference of the first pipe and an outer circumference of the second pipe.

BRIEF DESCRIPTION OF THE DRAWINGS

The present invention will be described in even greater detail below based on the exemplary FIGURES. The invention is not limited to the exemplary embodiments. Other features and advantages of various embodiments of the present invention will become apparent by reading the following detailed description with reference to the attached drawings which illustrate the following:

The FIGURE shows an exemplary embodiment of a sealing arrangement according to the invention, which is used in a coolant system of a motor vehicle.

DETAILED DESCRIPTION

In an embodiment, the present invention provides a sealing arrangement which can be produced and assembled in a simple and cost-effective manner. In an embodiment, the present invention also provides a sealing sleeve by means of which pipes connected to form a line can be sealingly connected to each other in a simple and cost-effective manner. In addition, in an embodiment, the present invention also provides a use of sealing arrangement and sealing sleeve.

In an embodiment, the present invention provides a sealing arrangement comprising a first pipe and a second pipe, which are arranged substantially adjacent to each other in their flow direction and together form a line, wherein the first pipe has a first end and the second pipe has a second end, wherein the first end encloses the second end with a radial spacing, and a sealing sleeve consisting of a sealing material, wherein the sealing sleeve is sealingly arranged under radial elastic preloading in the gap formed by the spacing and sealingly contacts the inner circumference of the first pipe and the outer circumference of the second pipe.

In the sealing arrangement according to the invention, the mutually facing ends of the two pipes, which together form the line, are arranged one inside the other with the interposition of the sealing sleeve. There is no need for a complex hose connection with clamp fastening in order to sealingly connect the ends. The ends are sealed by the sealing sleeve.

The sealing sleeve consists of a sealing material for sealing in a medium-tight manner the transition of the two pipes to each other.

The sealing material can be of a uniform material and consist, for example, of . . . . Such a sealing sleeve can be produced in a particularly simple manner and after use can be recycled sorted as a single material.

The sealing sleeve can consist of a rubber-elastic sealing material. Depending on the particular application, the material of which the sealing sleeve consists should be sufficiently temperature-resistant and/or medium-resistant.

It can be provided that the sealing sleeve consists of a two-component material, comprising a first component X made of thermoplastic and a second component Y made of elastomer. The thermoplastic may comprise PA6, PA66 GF, PP, PPA, PPS, or the like; the elastomer may comprise rubber, thermoplastic elastomers, or the like.

The first component X made of thermoplastic is used as a carrier material in the region of the sealing sleeve; the second component Y made of elastomer is arranged as a sealing material for sealing externally and internally in the region of the sealing sleeve.

The two components X and Y are connected to each other in a firmly bonded, durable, and sealed manner.

A sealing sleeve made of a two-component material, which consists of the components X (thermoplastic) and Y (elastomer), has the advantage that the sealing sleeve is thereby adapted particularly well to the respective conditions of the application.

The component X made of thermoplastic is advantageous for the above-described region as a carrier composite material because the sealing component/sealing sleeve can be positioned properly and can be integrated and designed in an automaton-friendly and assembly-friendly manner.

The sealing sleeve component Y made of elastomer is advantageous for the above-described region because the sealing sleeve can be assembled properly and process-reliably with no twisting and at a precise position.

The first and/or the second pipe may consist of a hard tough material or a flexible material. When using a sealing sleeve which consists of a substantially rubbery-elastic sealing material, the pipes may consist of a hard tough material, for example a hard tough plastic or a metallic material. Production-related and/or assembly-related tolerances are compensated for by the sealing sleeve. Hard tough materials are generally less expensive than pipes made of a flexible material.

The first end may be widened radially from a first inner pipe diameter to an inner flange diameter. By widening the first end to the flange diameter, the line formed by the pipes can also have a substantially constant flow cross-section in the transition region from one pipe to the other. The second end of the second pipe is sealingly arranged within the inner flange diameter of the first pipe.

The second pipe can have a second inner pipe diameter that substantially corresponds to the first inner pipe diameter. The flow cross-section of the line is thereby substantially constant, and undesired turbulences of the flow medium are avoided.

The first end may have a rim extending radially outward in the shape of a collar. The sealing sleeve can be fastened to this rim.

At one end, the sealing sleeve can comprise a clamp-shaped holding claw which positively engages around the rim. This has the advantage that the sealing sleeve is always correctly positioned with respect to the first pipe to which it is fastened.

The first pipe and the sealing sleeve may preferably form a pre-assemblable unit. This further simplifies the mounting of the first pipe with the sealing sleeve and the assembly of the sealing arrangement. The entire sealing arrangement has a structure consisting of a particularly low number of parts. In such a case, the sealing arrangement consists only of two individual parts to be fitted to each other, namely the pre-assembled unit and the second pipe, which is sealingly connected to the pre-assembled unit.

At the other end, at the side facing axially away from the holding claw, the sealing sleeve can have for the second end an axial stop which extends substantially radially inward and has an inner diameter which substantially corresponds to the two inner pipe diameters. The risk of assembly errors is minimized by the axial stop.

The second pipe is assembled into the above-described pre-assembled unit in such a way that the second end of the second pipe is axially inserted into the sealing sleeve until the second end abuts against the axial stop of the sealing sleeve. The axial stop is thus a positioning aid in order to enable assembly of the sealing arrangement as simply, quickly, and correctly as possible.

The inner diameter therefore substantially corresponds to the two inner pipe diameters because the flow cross-section of the line will then also be substantially constant in the mutual transition region of the two pipes.

The sealing sleeve can have a substantially hollow-cylindrical casing in the axial direction between the holding claw and the axial stop. The casing has an axial length that substantially corresponds to the axial length of the widened flange of the first pipe.

The casing may have sealing beads arranged axially adjacent to one another. In particular when the sealing sleeve consists of a sealing material which is by definition incompressible, it is advantageous that the sealing beads limit free spaces between the sealing beads, into which the material of the sealing sleeve which is displaced as a result of the assembly can divert when the sealing arrangement is assembled. On the one hand, this protects the material of the sealing sleeve from undesirably high mechanical loads, and on the other hand, the assembly of the sealing arrangement is substantially simplified. The risk of damage to the sealing sleeve during assembly of the sealing arrangement and the resultant risk of leaks during the intended use of the sealing arrangement are thereby limited to a minimum in each case.

The sealing beads may curve radially outward in the direction of the first pipe and/or radially inward in the direction of the second pipe.

It is particularly advantageous if the sealing beads are curved radially outward in the direction of the first pipe and radially inward in the direction of the second pipe and in each case have a substantially circular cross-section as viewed in section. In the assembled state of the sealing arrangement, the substantially circular cross-section of the sealing beads in the contact region with the inner circumference of the first pipe and the outer circumference of the second pipe is in each case somewhat elastically flattened, wherein the sealing takes place in the region of the flattened sections. If a plurality of sealing beads are used next to one another in the flow direction of the line, the sealing beads will be arranged in a functional series connection. The sealing in the mutual transition region of the pipes is particularly good as a result.

The second end can have at least one circumferential bead-shaped thickened section which is arranged axially between two sealing beads arranged axially adjacent to each other. By means of such an embodiment, the second pipe is accommodated positively and non-positively in the sealing sleeve held in the widened flange of the first pipe. The risk of an undesired axial displacement of the second pipe relative to the sealing sleeve is thereby reduced. In addition, during assembly, the fitter is thereby given an indication of the correct assembly of the sealing arrangement when the bead-shaped thickened section of the second pipe snaps into place between the sealing beads of the sealing sleeve.

The invention also relates to a sealing sleeve as described above.

The sealing sleeve consists of a sealing material and comprises the casing which has the holding claw at one end and the axial stop at the other end. By means of the holding claw, the sealing sleeve can be fixed to one of the machine elements that are to be connected to each other and form a pre-assembled unit therewith. By means of the axial stop, the machine elements to be connected to each other can be positioned simply and exactly relative to one another.

The casing may have sealing beads arranged axially adjacent to one another.

Together with the machine elements which contact the sealing beads during the intended use of the sealing sleeve, these sealing beads form sealing regions in order to seal from the environment a medium flowing through a pipe connection, for example.

The sealing beads may be curved radially outward and/or radially inward. The sealing beads are preferably curved radially outward and radially inward and in each case have a substantially circular cross-section as viewed in section. In the installed state of the sealing sleeve, the sealing beads abut under radial elastic preloading the sealing surfaces of pipes to be sealed against each other. The resulting flattened sections of the sealing beads improve the sealing effect of the sealing sleeve.

The invention furthermore relates to the use of a sealing arrangement and a sealing sleeve, in each case as described above. According to the invention, it is provided that the sealing arrangement and the sealing sleeve are used in a coolant system of a motor vehicle. Coolant systems of motor vehicles have previously comprised a multiplicity of complex hose connections with clamp fasteners, which were in each case expensive to manufacture and complex to assemble. Coolant systems of a motor vehicle can now be substantially simplified by means of the sealing arrangement according to the invention and the sealing sleeve according to the invention.

An exemplary embodiment of the sealing arrangement according to the invention and of the sealing sleeve according to the invention are described in greater detail below with reference to the FIGURE.

The FIGURE shows an exemplary embodiment of a sealing arrangement according to the invention, which is used in a coolant system of a motor vehicle.

The sealing arrangement according to the invention comprises the sealing sleeve 7 according to the invention.

The FIGURE shows a detail of a coolant system of a motor vehicle in the region of the connection of the two pipes 1, 2.

In the exemplary embodiment shown, the first pipe 1 is made of a hard tough plastic, for example of polyamide, and the second pipe 2 is made of steel. The two pipes 1, 2 are arranged adjacent to each other in the flow direction 3 and together form the line 4 through which coolant can flow. The pipes 1, 2 are sealingly connected to each other in the region of their mutually facing ends 5, 6 by the sealing sleeve 7.

The first end 5 of the first pipe 1 is widened radially 13 from the first inner pipe diameter 14 to the inner flange diameter 15. The first end 5 encloses the second end 6 of the second pipe 2 at a radial distance, wherein the sealing sleeve 7 is arranged sealingly under radial elastic preloading in the gap 8 formed by the spacing. By means of its sealing beads 24, 25, 26, the sealing sleeve 7 seals with respect to the inner circumference 9 of the first pipe 1 and with respect to the outer circumference 10 of the second pipe.

In the exemplary embodiment shown, the sealing sleeve 7 consists of a two-component material and comprises the first component X 11 made of thermoplastic (for example, PA6, PA66 GF, PP, PPA, PPS, or the like) and the second component Y 12 made of elastomer (for example, rubber, thermoplastic elastomers, or the like).

The second inner pipe diameter 16 of the second pipe 2 and the first inner pipe diameter 14 of the first pipe 1 are substantially the same, as is the inner diameter 21 of the axial stop 20, so that the flow cross-section of the line 4 is also substantially constant in the connection region of the two pipes 1, 2. The flow resistance is low, and undesired turbulences are avoided.

The first end 5 has a rim 17 which extends in the shape of a collar radially 13 outward and on which the sealing sleeve 7 with its clamp-shaped holding claw 18 is positively fastened. The axial stop 20, which extends radially inward and is supported on the first pipe 1 at the one end as viewed in the axial direction 22, is provided at the end of the casing 23 facing axially away from the holding claw 18. At the other end in the axial direction 22, the axial stop 20 forms a stop for the second end 6 of the second pipe 2 during the assembly of the sealing arrangement. The second end 6 abutting directly onto the first pipe 1 is thereby ruled out.

In the exemplary embodiment shown, three sealing beads 24, 25, 26, which are arranged axially 22 adjacent to one another and which in each case have a substantially circular cross-section, are shown by way of example.

The second end 6 is arranged with its bead-shaped thickened section 27 axially between the two sealing beads 24, 25. The second end 6 is thereby sealingly connected positively and non-positively to the pre-assembled unit 19.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A sealing arrangement, comprising:
   a first pipe and a second pipe, which are arranged substantially adjacent to each other in a flow direction and together form a line, the first pipe having a first end and the second pipe having a second end, the first end enclosing the second end at a radial spacing; and
   a sealing sleeve including a thermoplastic element embedded in an elastomer, the sealing sleeve being sealingly arranged under radial elastic preloading in a gap formed by the spacing such that the elastomer sealingly contacts an inner circumference of the first pipe and an outer circumference of the second pipe, wherein;
   the first end has a rim protruding radially outward in a shape of a collar, and
   the elastomer of the sealing sleeve is configured to surround the rim of the first end,
   both the thermoplastic element and the elastomer are arranged between the first pipe and the second pipe in the gap, and
   the thermoplastic element extends axially within the gap and includes a radial protrusion extending radially away from the second pipe.

2. The sealing arrangement of claim 1, wherein the first and/or the second pipe comprises a hard tough material or a flexible material.

3. The sealing arrangement of claim 1, wherein the first end is widened radially from a first inner pipe diameter to an inner flange diameter.

4. The sealing arrangement of claim 3, wherein the second pipe has a second inner pipe diameter which substantially corresponds to the first inner pipe diameter.

5. The sealing arrangement of claim 1, wherein the sealing sleeve comprises at one end a clamp-shaped holding claw which positively engages around the rim.

6. The sealing arrangement of claim 5, wherein the sealing sleeve has at an other end, on a side facing axially away from the holding claw, an axial stop, substantially protruding radially inward, for a second end, the axial stop having an inner diameter which substantially corresponds to the two inner pipe diameters.

7. The sealing arrangement of claim 6, wherein the sealing sleeve has a substantially hollow-cylindrical casing in an axial direction between the holding claw and the axial stop.

8. The sealing arrangement of claim 7, wherein the casing has sealing beads arranged axially adjacent to one another.

9. The sealing arrangement of claim 8, wherein the sealing beads are curved radially outward in a direction of the first pipe and/or radially inward in a direction of the second pipe.

10. The sealing arrangement of claim 8, wherein the sealing beads are curved radially outward in a direction of the first pipe and radially inward in a direction of the second pipe and in each case have a substantially circular cross-section as viewed in section.

11. The sealing arrangement of claim 6, wherein the second end has at least one circumferential bead-shaped thickened section which is arranged axially between two sealing beads arranged axially adjacent to each other.

12. The sealing arrangement of claim 6, wherein the axial stop is arranged between the second end and the first pipe in the flow direction and is arranged to form a flush inner surface together with a radially inner surface of the first pipe.

13. The sealing arrangement of claim 1, wherein the first pipe and the sealing sleeve form a pre-assembled unit.

14. The sealing arrangement of claim 1, wherein the thermoplastic comprises PA6, PA66 GF, PP, PPA, PPS, or the like and the elastomer comprises rubber, thermoplastic elastomers, or the like.

15. The sealing arrangement of claim 1, wherein the elastomer is further configured to contact the second end, the elastomer including a contiguous extent from the rim of the first end, along the outer circumference of the second pipe, and to the second end.

16. The sealing arrangement of claim 1, wherein the the thermoplastic element extends along an entire axial length over which the first pipe and the second pipe overlap.

17. A sealing sleeve, comprising:
a sealing material configured to seal a first pipe and a second pipe together;
a clamp-shaped holding claw comprising an elastomer and configured to positively engage a first end of the first pipe and wrap around both inner and outer radial surfaces of the first end, the holding claw being arranged at one end of the sealing sleeve;
an axial stop arranged at an other end of the sealing sleeve facing axially away from the holding claw, the axial stop substantially protruding radially inward and having an inner diameter which substantially corresponds to an inner diameter of the first and second pipes; and
a substantially hollow-cylindrical casing in an axial direction between the holding claw and the axial stop.

18. The sealing sleeve of claim 17, wherein the casing has sealing beads arranged axially adjacent to one another.

19. The sealing sleeve of claim 17, wherein the sealing beads are curved radially outward and/or radially inward.

20. The sealing sleeve of claim 17, wherein the sealing beads are curved radially outward and radially inward and in each case have a substantially circular cross-section as viewed in section.

* * * * *